Jan. 8, 1935.    E. N. SNODGRASS    1,987,084
METHOD OF PRODUCING COMPOSITE CONFECTIONS
Filed Dec. 12, 1932
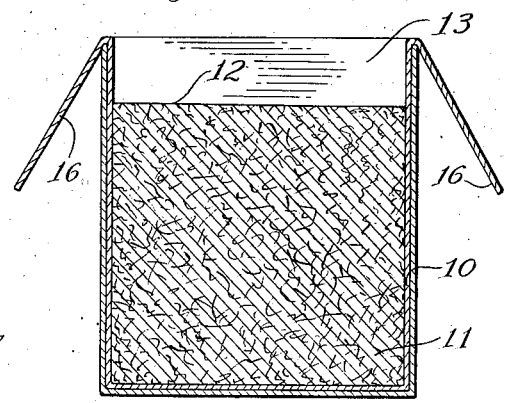
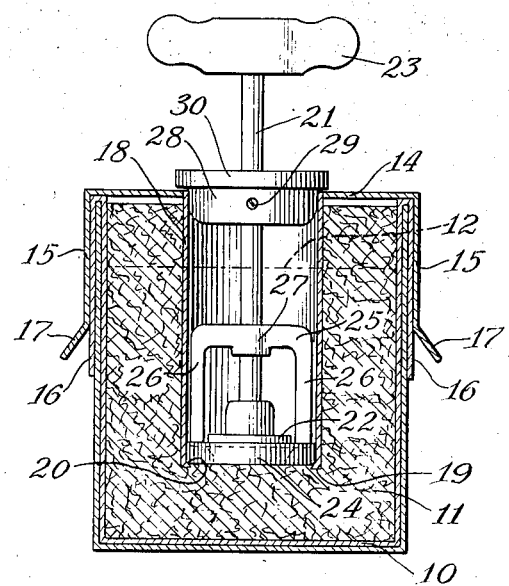
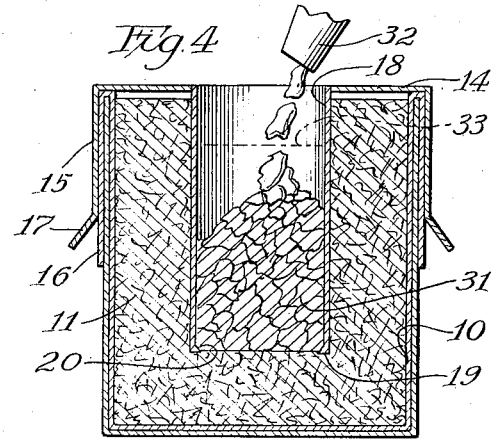
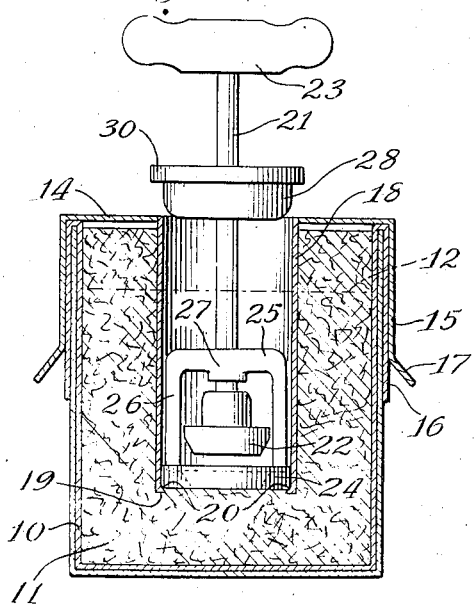
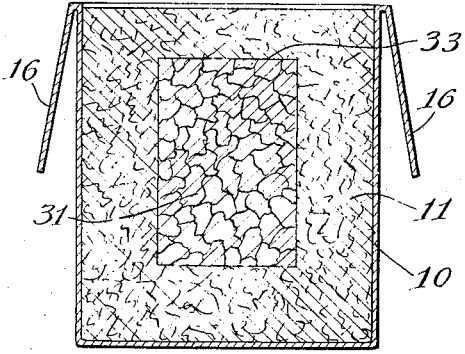
Witness:
C M Rodi
Inventor:
Edward Norman Snodgrass
By Harry C. Alberts
Atty.

Patented Jan. 8, 1935

1,987,084

UNITED STATES PATENT OFFICE 1,987,084

METHOD OF PRODUCING COMPOSITE CONFECTIONS

Edward Norman Snodgrass, Denver, Colo., assignor to Norman Confections, Inc., Denver, Colo., a corporation of Colorado Application December 12, 1932, Serial No. 646,863

3 Claims. (Cl. 107—54)

This invention relates to improvements in refrigerated composite products and more particularly to their method of manufacture, although certain features thereof may be employed with equal advantage for other purposes.

It contemplates more especially the provision of a novel method of preparing normally unstable composite products so as to effect the relative association of the constituents without entailing much time, labor or expense.

Ice cream products and refrigerated edibles are becoming increasingly popular, but an objectionable feature is the inability to produce such on a production basis. This is especially true of normally unstable composite products, since the incorporation of a filler in predetermined relation and enclosure serves to create difficult problems in production. More particularly, normally unstable products which attempt to confine various forms of fillers such as syrups and/or solids are incapable of assimilation and retention without undue care, speed, and attentive handling constituting requisites in commercial practice.

With the teachings of the instant invention, the intricate features of producing normally unstable ice cream and products are entirely overcome, and improved ice cream edibles and products are capable of advantageous preparation, distribution and consumption with enhanced taste and facility and without the necessary resort to dishes, forks or other commonly employed eating implements. Moreover, most any type of product filler may be employed with liquid or syrupy taste imparting ingredients such as fruit, solid edibles and viscous syrups to the end that novel ice cream sundaes may be readily produced and served over the counter in a very tasty and improved manner.

The production of such normally unstable products has heretofore involved very difficult and careful moulding operations together with temperature controls and numerous repeat steps involving expensive and cumbersome apparatus. Then, too, known processes entail much time and labor to the end that numerous obstacles confronted the commercial production of products of the type mentioned. These disadvantages have been entirely overcome with the teachings of the instant invention pertaining to a novel method of confection production without entailing much time, labor, equipment and expense.

Simplicity, speed, and a minimum investment in equipment are conducive factors in a commercially practical process or method of manufacture.

One object of the present invention is to provide a novel method of producing normally unstable products of a composite character.

Another object is to provide a very novel method of assimilating and associating various edible constituents in the formation of a normally unstable composite product.

Still another object is to provide a novel method of producing composite ice cream products having a filler suspended therein in predetermined relation therewith.

A further object is to provide a novel method of introducing a filler within a normally liquid material frozen to a substantially solid state in preparation for marketing and consumption.

Still a further object is to introduce a filler of predetermined form in an ice cream brick so as to form a composite edible for consumption.

A still further object is to process normally liquid materials for conversion into a composite edible having a frozen casing with fillers of varied stability.

Other objects and advantages will appear from the following description of an illustrative embodiment of the present invention.

In the drawing:

Figure 1 is a sectional view in elevation of a carton having a plastic freeze confined therein to an unfilled level to illustrate the initial step of the process embodying teachings of the present invention.

Figure 2 is a sectional view in elevation of the carton and contents disclosed in Figure 1 with a device associated therewith to momentarily produce a cavity for filler confinement.

Figure 3 is a sectional view in elevation corresponding with the view in Figure 1, the cavity forming device being shown in its position of initial displacement.

Figure 4 is a sectional view in elevation of the container disclosed in Figure 3 after the plunger element has been removed from the cavity forming device.

Figure 5 is a sectional view in elevation of the completed composite product resulting from the process embodying features of the present invention.

The structure selected for illustration exemplifies a novel process of producing a normally unstable product consisting of the composite association of different materials in predetermined relation to present a frozen edible. In the present embodiment, a carton 10 of standard or approved construction serves as a container into which a soft plastic or flowable freeze 11 is poured directly from a machine utilized for the production thereof. Any ice cream producing machine may be employed for this purpose, and the cartons 10 may be supplied to the discharge end thereof for progressive intermittent movement along a predetermined path until the contents reach an unfilled level 12. The level 12 of the soft freeze 11 within the container 10 may be determined and selected so that the unfilled or unoccupied container volume 13 is equivalent to and corresponds with the eventual cavity to be formed in a manner which will appear more fully hereinafter. Obviously, the unoccupied volume 13 at the terminus of the initial step of the process will vary depending upon the capacity of the container 10 and the desired volume of the filler to be confined within the edible casing.

With the container 10 filled with the flowable freeze 11 to the level 12, it passes to an operator who utilizes any desired means or expedient to incorporate a filler for total confinement therein. The means or expedients employed will depend largely upon the character of the filler, but the principle may be best explained and illustrated by resort to a mechanism to be hereinafter described. In the present embodiment, the mechanism comprises a plate 14 having depending sides 15 sized and shaped to telescopically receive the container 10 with its flaps 16 reversely folded to parallel the container sides in continuity therewith. It is to be noted that the depending sides 15 of the closure plate 14 terminate in outwardly inclined extensions 17 which enable the ready reception of the container 10 with its flaps 16 which have the open region thereof closed by the plate 14 in the completely telescoped position thereof.

It is to be noted that the plate 14 is centrally apertured to receive an elongated tube 18 for communication therethrough, the tube 18 terminating in an open end 19 having inwardly directed peripheral ridge 20 to limit the reception of a plunger mechanism to be presently described. The plunger mechanism comprises, in this instance, a rod 21 which terminates in a valve disc 22 fixed to one extremity thereof. The other extremity of the rod 21 is provided with a handle member 23 to enable the manual manipulation and displacement of the valve 22 together with its auxiliary parts within the tube 18. As shown, a valve seat 24 sized and shaped to correspond with and serve as a complement of the valve 22, is slidably associated with the rod 21 through the medium of an inverted U-shaped bracket 25 having the arms 26 thereof in attached engagement with the valve seat 24.

It is to be noted that the bracket 25 has a boss 27 formed along a vertical longitudinal median line, it being bored to slidably receive the rod 21 so that the valve seat 24 will fully occupy the tube 18 and be slidable therealong for engagement with the peripheral ridge 20 to serve as a closure for the tube 18. In its fully telescoped position, the valve seat 24 engages the valve 22 so as to completely close the tube 18, and a stop member 28 may be fixed to the rod 21 so as to close the other end of the tube 18, it being provided with a set screw or other fastener 29 to adjust the position thereof along the rod 21. In this instance, stop member 28 is provided with a shoulder 30 which rests upon the closure plate 14 to guide the rod 21 and assist in the alignment of the valve seat 24 slidable therealong for association and removal relative to the valve 22.

With the arrangement of parts above described, it is apparent that the closure plate 14 with its plunger mechanism in fully telescoped position within the tube 18 may be placed upon the carton 10 after it has been filled with a freeze to a level 12 leaving an unoccupied volume equivalent to the volume of the tube 18 which depends in the soft freeze 11 for a distance short of the bottom thereof. As a result, the tube 18 which is closed by the valve 22 and its valve seat 24, displaces the freeze 11 so as to substantially occupy the interior volume of the container 10. Thereupon, the plunger mechanism is removed by exerting an upward pull upon the handle member 23. This initially removes the valve 22 from its seat 24 to establish communication between the atmosphere and the tube interior so as to afford the ready removal of the valve seat 24 without withdrawing the freeze 11 therewith into the tube 18. Upon the removal of the plunger mechanism, a cavity is defined within the container 10 by means of the tube 18 in that the freeze 11 is of such a plastic character as to preclude the immediate upward displacement thereof.

The container 10 is then moved along a predetermined path of travel for the incorporation of a filler therein. The filler may be of any desired character and could consist of dried or candied fruit, nuts or other edible solids 31 poured or otherwise incorporated therein through a funnel or a spout 32 should commercial practice so dictate. The tube 18 is, thereupon, filled with the edible solids 31 or a mixture thereof with a viscous or liquid substance to a predetermined level 33. Thereupon the closure plate 14 with its tube 18 is removed from its container 10 so that the surrounding freeze 11 will in effect submerge the solids 31, and the resulting product is now ready for further filling with additional freeze 11 to fully enclose the filler 31 or such part thereof as may be left exposed as well as completely occupy the container 10. The flaps 16 of the container 10 are then overlapped and connected so as to protect and fully enclose the contents 11 with its filler 31 in suspension. The containers 10 are then transferred to the hardening room for subjection to lower temperatures to effect the complete freezing thereof to define a form-maintaining and retaining casing.

It is to be noted that with solid fillers of a unitary character and preformed configuration, no apparatus or expedient may be utilized to any advantage except by direct manual grasp and submerged displacement within the freeze 11. In short, a solid edible filler such as a preformed elongated bar of fudge or other substance may be sized to correspond with the unoccupied container volume 13 for direct incorporation within the freeze 11 by manual submergence until the level 12 thereof fully occupies the container 10. Thereupon, the carton container 10 may be closed and removed to the hardening room for freezing in a manner and for the purpose described supra.

Various changes may be made in the embodiment of the invention herein specifically described without departing from or sacrificing any of the advantages of the invention as defined in the appended claims.

I claim:

1. A method of producing a normally unstable composite edible which consists in confining a normally liquid flowable edible freeze in a preformed container to an unfilled level leaving an unoccupied volume for filler displacement, inserting an elongated member in said freeze to define a cavity therein by effecting the displacement thereof, then introducing through said elongated member a normally stable filler sized substantially equivalent to the unoccupied container volume for complete suspension in said freeze to fully occupy said container therewith, then removing said elongated member, and then subjecting the container with its contents to refrigeration for rendering the resulting composite edible sustaining and form retaining.

2. A method of producing a normally unstable composite edible which consists in confining a normally liquid flowable edible freeze in a preformed container to an unfilled level leaving an unoccupied volume for filler displacement, inserting an elongated member in said freeze to define a cavity therein by effecting the displacement thereof, then removing the interior of said elongated member to render such tubular for open passage therethrough, then introducing through said elongated member a normally stable filler sized substantially equivalent to the unoccupied container volume for complete suspension in said freeze to fully occupy said container therewith, then removing said elongated member, and then subjecting the container with its contents to refrigeration for rendering the resulting composite edible sustaining and form retaining.

3. A method of producing a normally unstable composite edible which consists in confining a normally liquid flowable edible freeze in a preformed container to an unfilled level leaving an unoccupied volume for filler displacement, defining a cavity in said freeze by effecting the displacement thereof by introducing an elongated tubular member therein, then introducing through the interior of said elongated member a normally stable filler sized substantially equivalent to the unoccupied container volume, then removing said elongated member for complete suspension of said normally stable filler in said edible freeze to fully occupy said container therewith, and then subjecting the container with its contents to refrigeration for rendering the resulting composite edible sustaining and form retaining.

EDWARD NORMAN SNODGRASS.